(12) United States Patent
Kato et al.

(10) Patent No.: US 6,999,392 B2
(45) Date of Patent: Feb. 14, 2006

(54) OPTICAL RECORDING METHOD AND OPTICAL RECORDING MEDIUM

(75) Inventors: Tatsuya Kato, Tokyo (JP); Hajime Utsunomiya, Tokyo (JP); Hiroyasu Inoue, Tokyo (JP); Hiroshi Shingai, Tokyo (JP); Yoshitomo Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 480 days.

(21) Appl. No.: 09/971,703

(22) Filed: Oct. 9, 2001

(65) Prior Publication Data

US 2002/0064117 A1    May 30, 2002

(30) Foreign Application Priority Data

Oct. 10, 2000 (JP) .............................. 2000-309954
Sep. 7, 2001 (JP) .............................. 2001-272670

(51) Int. Cl.
*G11B 7/00* (2006.01)
*G11B 7/24* (2006.01)

(52) U.S. Cl. .............................. 369/59.11; 369/275.2; 369/275.4

(58) Field of Classification Search .............. 369/275.1, 369/275.2, 275.4, 59.11, 116, 100, 13.25, 369/13.26, 47.5, 47.51, 47.52, 47.53
See application file for complete search history.

(56) References Cited

U.S. PATENT DOCUMENTS

| 5,003,527 A | * | 3/1991 | Matsumoto et al. | ......... 369/100 |
| 5,654,953 A | * | 8/1997 | Yoshida et al. | ........... 369/275.1 |
| 6,040,030 A | | 3/2000 | Utsunomiya et al. | |
| 6,497,935 B1 | * | 12/2002 | Ogawa | ....................... 428/64.1 |
| 6,515,952 B1 | * | 2/2003 | Kikukawa et al. | ........ 369/59.12 |
| 6,567,367 B1 | * | 5/2003 | Ohno et al. | ............... 369/47.51 |

FOREIGN PATENT DOCUMENTS

| JP | 11-232697 | 8/1999 |
| JP | 2000-132836 | 5/2000 |
| JP | 2000-231725 | 8/2000 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

Increase of jitter in a phase change optical recording medium is suppressed with no extreme decrease in the crystallization speed of the recording layer when the medium is overwritten at a high linear velocity. In addition, in a disk-shaped medium operated at a constant angular velocity, the overwriting is accomplished with the increase of jitter suppressed over the entire area of the medium. Provided is an optical recording method for recording a disk-shaped optical recording medium having a phase change recording layer which is rotated at a constant angular velocity, wherein amorphous recorded marks are formed in the recording layer. In this method, the minimum recorded mark is formed such that $W_L/M_L$ incrementally or gradually decreases from the radially inner side to the radially outer side of the optical recording medium, when the minimum signal has a length of $S_L$, and when the minimum recorded mark corresponding to said minimum signal has its maximum width of $M_W$, $E_W$ is 0.1 $M_W$; the position on the leading edge side of the recorded mark at the width of $E_W$ is designated effective leading edge; and the position on the trailing edge side of the recorded mark at the width of $E_W$ is designated effective trailing edge; the distance between the effective leading edge and the effective trailing edge is designated effective length $M_L$; and the distance between the effective leading edge and the position at which the width starts to decrease on the trailing edge side is designated $W_L$.

39 Claims, 5 Drawing Sheets

OPTICAL RECORDING METHOD AND OPTICAL RECORDING MEDIUM

BACKGROUND OF THE INVENTION

This invention relates to a method for recording a phase change optical recording medium and an optical recording medium adapted for use in such method.

Highlight is recently focused on optical recording media capable of recording information at a high density and erasing the recorded information for overwriting. One typical overwritable optical recording medium is phase change optical recording medium wherein a laser beam is irradiated to the recording layer to change its crystalline state whereupon a change in reflectivity by the crystallographic change is detected for reading of the information. The phase change optical recording media are of great interest since the medium can be overwritten by modulating the intensity of a single laser beam and the optical system of the drive unit is simple as compared to magnetooptical recording media.

Such phase change recording layer is typically produced from a material of chalcogenide system such as Ge—Te system and Ge—Sb—Te system since the recording layer produced by using such material provides substantial difference in reflectivity between the crystalline and amorphous states as well as a relatively stable amorphous state.

When information is recorded on the phase change optical recording medium, the entire recording layer is first brought into crystalline state, and then, a laser beam of high power level (recording power level) is applied so that the recording layer is heated to a temperature equal to or higher than the melting point. In the region irradiated with such beam, the recording layer is melted and thereafter quenched to form an amorphous recorded mark. When the recorded mark is erased, a laser beam of relatively low power level (erasing power level) is applied so that the recording layer is heated to a temperature equal to or higher than the crystallization temperature and lower than the melting point. The recorded mark which is irradiated with such laser beam is heated to a temperature higher than the crystallization temperature and then allowed to slowly cool to recover the crystalline state. Accordingly, in the phase change optical recording media, the medium can be overwritten by modulating the intensity of a single light beam.

In a phase change medium which can be rewritten by overwriting, amorphous recorded marks are formed by irradiating the crystalline recording layer with a laser beam of recording power level to melt the recording layer, and quenching the molten area to thereby form the amorphous recorded marks. In the erasing, the amorphous recorded marks are irradiated with the laser beam of erasing power level which is lower than the recording power level to heat the layer to a temperature equal to or higher than the crystallization temperature of the recording layer and lower than the melting point, and then gradually cooling the layer to thereby crystallize the amorphous recorded marks. As described above, overwriting can be accomplished by irradiating a single laser beam with its intensity modulated.

When a phase change medium is overwritten at a high speed, amorphous recorded marks should be erased (crystallized) at a high linear velocity. The rate determining factor in such process has been crystallization speed of the recording layer, namely, speed of crystalline phase conversion in the change from amorphous to crystalline phase. While overwriting at a high speed can be accomplished by using a recording layer of high crystallization speed, excessively high crystallization speed is likely to result in crystallization of the amorphous recorded marks, and hence, unstability of the medium. The medium then suffers from reduced reading stability and storage reliability. In the meanwhile, overwriting of the medium having a recording layer of low crystallization speed is associated insufficient erasing of the recorded marks as well as increase in the jitter.

A recording layer of high crystallization speed is associated with the phenomenon of selferase wherein the recorded marks partly become recrystallized in the recording due to the heat conduction in the in-plane direction as well as crosserase wherein the recorded marks on the adjacent track are erased in the recording. Both selferase and crosserase invite increase in the jitter.

As described above, it is difficult in an overwritable phase change medium to drastically increase the crystallization speed of the recording layer, and hence, the data transfer rate.

When the phase change medium is a disk-shaped medium which rotates at a constant angular velocity, the medium is associated with the problem as described below. It is to be noted that typical recording formats wherein the disk is operated at a constant angular velocity include CAV (Constant Angular Velocity) and MCAV (Modified CAV) systems. Recording formats are described, for example, in page 223 of "Optical Disk Technology" published from Radio Technology Inc. on Feb. 10, 1989.

The linear velocity of a disk-shaped medium which rotates at a constant angular velocity is slower in the radially inner side and faster in the radially outer side of the disk. On the other hand, a recording layer typically has a uniform crystallization speed over its entire area since the composition of the recording layer is uniform over its entire area. As a consequence, when the crystallization speed of the recording layer is determined so that sufficient erasability is attained at the linear velocity in the radially inner side of the medium, the disk is likely to suffer from an increased jitter in the radially outer side of the disk where the disk is operated at a higher linear velocity.

SUMMARY OF THE INVENTION

In view of the situation as described above, an object of the present invention is to suppress the increase of jitter in a phase change optical recording medium without inducing any drastic increase in the crystallization speed of the recording layer when the medium is overwritten at a high linear velocity. Another object of the invention is to suppress the jitter increase over the entire area of the medium when the disk-shaped medium is overwritten at a constant angular velocity.

Such objects are attained by the present invention as described in (1) to (20), below.

(1) An optical recording method for recording a disk-shaped optical recording medium having a phase change recording layer which is rotated at a constant angular velocity, wherein amorphous recorded marks are formed in the recording layer; wherein when the minimum signal has a length of $S_L$; and when the minimum recorded mark corresponding to said minimum signal has its maximum width of $M_W$, $E_W$ is 0.1 $M_W$; the position on the leading edge side of the recorded mark at the width of $E_W$ is designated effective leading edge; and the position on the trailing edge side of the recorded mark at the width of $E_W$ is designated effective trailing edge; the distance between the effective leading edge and the effective trailing edge is designated effective length ML; and the distance between the effective leading edge and the position at which the width starts to decrease on the trailing edge side is designated $W_L$;

the minimum recorded marks are formed such that $W_L/M_L$ incrementally or gradually decreases of the optical recording medium.

(2) An optical recording method according to the above (1) wherein minimum recorded marks satisfying the relation:

$$0.1 \leq W_L/M_L \leq 0.7$$

are formed at least in a part of the recording layer.

(3) An optical recording method for recording a disk-shaped optical recording medium having a phase change recording layer which is rotated at a constant angular velocity, wherein amorphous recorded marks are formed in the recording layer; wherein when the minimum signal has a length of $S_L$; and when the minimum recorded mark corresponding to said minimum signal has its maximum width of $M_W$, $E_W$ is 0.1 $M_W$; the position on the leading edge side of the recorded mark at the width of $E_W$ is designated effective leading edge; and the position on the trailing edge side of the recorded mark at the width of $E_W$ is designated effective trailing edge; and the distance between the effective leading edge and the effective trailing edge is designated effective length $M_L$;

the minimum recorded marks are formed such that $S_L/M_L$ incrementally or gradually decreases from the radially inner side to the radially outer side of the optical recording medium.

(4) An optical recording method according to the above (3) wherein minimum recorded marks satisfying the relation:

$$0.61 \leq S_L/M_L \leq 0.8$$

are formed at least in a part of the recording layer.

(5) An optical recording method for recording a disk-shaped optical recording medium having a phase change recording layer which is rotated at a constant angular velocity, wherein amorphous recorded marks are formed in the recording layer; wherein when the minimum signal has a length of $S_L$; and when the minimum recorded mark corresponding to said minimum signal has its maximum width of $M_W$, $E_W$ is 0.1 $M_W$; the position on the leading edge side of the recorded mark at the width of $E_W$ is designated effective leading edge; and the position on the trailing edge side of the recorded mark at the width of $E_W$ is designated effective trailing edge; the distance between the effective leading edge and the effective trailing edge is designated effective length $M_L$; the width of the recorded mark at a position wherein the distance from the effective leading edge is $S_L$ is designated $S_W$;

the minimum recorded marks are formed such that $S_W/M_W$ incrementally or gradually decreases from the radially inner side to the radially outer side of the optical recording medium.

(6) An optical recording method according to the above (5) wherein minimum recorded marks satisfying the relation:

$$0.1 \leq S_W/M_W \leq 0.8$$

are formed at least in a part of the recording layer.

(7) An optical recording method according to any one of the above (1) to (6) wherein the relation:

$$4 \text{ m/s} \leq V_{min}$$

is satisfied when said optical recording medium is rotated at a minimum linear velocity of $V_{min}$.

(8) An optical recording method according to any one of the above (1) to (7) wherein the relation:

$$30 \text{ Mbps} \leq R_{min}$$

is satisfied when said optical recording medium has a minimum data transfer rate of $R_{min}$.

(9) An optical recording method according to any one of the above (1) to (8) wherein the relation:

$$4.5 \text{ m/s} \leq V_{max} - V_{min}$$

is satisfied when said optical recording medium is rotated at a minimum linear velocity of $V_{min}$ and a maximum linear velocity of $V_{max}$.

(10) An optical recording method according to any one of the above (1) to (9) wherein said minimum signal length $S_L$ is such that:

$$S_L \leq 350 \text{ nm}.$$

(11) An optical recording method according to any one of the above (1) to (10) wherein the relation:

$$30 \text{ Mbps} \leq R_{max} - R_{min}$$

is satisfied when said optical recording medium has a minimum data transfer rate of $R_{min}$ and a maximum data transfer rate of $R_{max}$.

(12) An optical recording method for recording an optical recording medium having a phase change recording layer, wherein amorphous recorded marks are formed in the recording layer; wherein when the minimum signal has a length of $S_L$; and when the minimum recorded mark corresponding to said minimum signal has its maximum width of $M_W$, $E_W$ is 0.1 $M_W$; the position on the leading edge side of the recorded mark at the width of $E_W$ is designated effective leading edge; and the position on the trailing edge side of the recorded mark at the width of $E_W$ is designated effective trailing edge; the distance between the effective leading edge and the effective trailing edge is designated effective length $M_L$; and the distance between the effective leading edge and the position at which the width starts to decrease on the trailing edge side is designated $W_L$;

minimum recorded marks satisfying the relation:

$$0.1 \leq W_L/M_L \leq 0.7$$

are formed over the entire area of the recording layer.

(13) An optical recording method for recording an optical recording medium having a phase change recording layer, wherein amorphous recorded marks are formed in the recording layer; wherein when the minimum signal has a length of $S_L$; and when the minimum recorded mark corresponding to said minimum signal has its maximum width of $M_W$, $E_W$ is 0.1 $M_W$; the position on the leading edge side of the recorded mark at the width of $E_W$ is designated effective leading edge; and the position on the trailing edge side of the recorded mark at the width of $E_W$ is designated effective trailing edge; and the distance between the effective leading edge and the effective trailing edge is designated effective length $M_L$;

minimum recorded marks satisfying the relation:

$$0.61 \leq S_L/M_L \leq 0.8$$

are formed over the entire area of the recording layer.

(14) An optical recording method for recording an optical recording medium having a phase change recording layer, wherein amorphous recorded marks are formed in the recording layer; wherein when the minimum signal has a length of $S_L$; and when the minimum recorded mark corresponding to said minimum signal has its maximum width of $M_W$, $E_W$ is $0.1 M_W$; the position on the leading edge side of the recorded mark at the width of $E_W$ is designated effective leading edge; and the position on the trailing edge side of the recorded mark at the width of $E_W$ is designated effective trailing edge; the distance between the effective leading edge and the effective trailing edge is designated effective length $M_L$; the width of the recorded mark at a position wherein the distance from the effective leading edge is $S_L$ is designated $S_W$;

minimum recorded marks satisfying the relation:

$$0.1 \leq S_W / M_W \leq 0.8$$

are formed over the entire area of the recording layer.

(15) An optical recording method according to any one of the above (12) to (14) wherein said optical recording medium is operated at a linear velocity of at least 8 m/s.

(16) An optical recording method according to any one of the above (1) to (15) wherein shape of the minimum recorded mark is such that its width decreases from the position wherein the width is its maximum toward both the leading edge and the trailing edge; the leading edge of the minimum recorded mark is arc shaped; and the trailing edge of the minimum recorded mark has a tail protruding rearward in the longitudinal direction of the recording track.

(17) An optical recording medium wherein the recorded marks are formed by the optical recording method of any one of the above (1) to (16).

(18) A disk-shaped optical recording medium which is rotated at a constant angular velocity, wherein the data transfer rate is at least 30 Mbps, and the jitter is up to 10%.

(19) A disk-shaped optical recording medium which is rotated at a constant angular velocity, wherein the minimum linear velocity is at least 4 m/s, and the jitter is up to 10%.

(20) A disk-shaped optical recording medium which rotates at a constant angular velocity, wherein difference between the maximum data transfer rate and the minimum data transfer rate is at least 30 Mbps, and the jitter is up to 10%.

DETAILED DESCRIPTION OF THE INVENTION

In the present invention, an optical recording medium having a phase change recording layer is recorded (overwritten) To be more specific, amorphous recorded marks formed in the crystalline recording layer are erased (crystallized), and at the same time, new amorphous recorded marks are formed in the recording layer by irradiating the recording layer with a recording laser beam which is power-modulated at least between the recording power level and the erasing power level which is lower than the recording power level.

Figure 1:
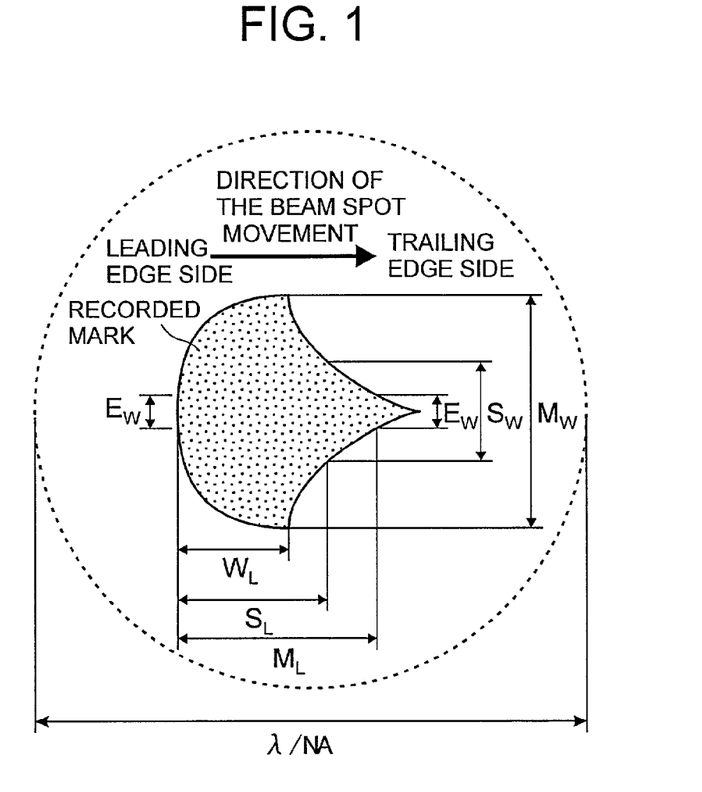
FIG. 1 is a schematic view showing a recorded mark.

FIG. 1 is a schematic view of the minimum recorded mark formed in the present invention when the medium is overwritten at a relatively high linear velocity. This recorded mark has the shape wherein the width reduces toward the leading edge and the trailing edge from the position where the width is at its maximum, and wherein the leading edge is in the form of an arc and the trailing edge has a tail which protrudes rearward in the longitudinal direction of the recording track. In other words, the recorded mark is in the shape of "ginkgo leaf". It should be noted that this recorded mark is the one which had been formed by the recording laser beam which moved in the direction from the side of the leading edge to the side of the trailing edge of the recorded mark.

In the present invention, the length of the minimum signal is designated $S_L$, and the minimum signal is the minimum signal of the modulated signals recorded in the medium. The length of the minimum signal is the length (distance) on the recording layer corresponding to the time duration of the minimum signal. Various dimensions are also defined in the present invention for the minimum recorded mark corresponding to the minimum signal, and the maximum width is designated $M_W$; $E_w$ is $0.1 M_W$; and the position on the side of the leading edge of the recorded mark where the width is $E_w$ is designated the effective leading edge of the recorded mark; and the position on the side of the trailing edge of the recorded marks where the width is $E_w$ is designated the effective trailing edge of the recorded mark. The distance between the effective leading edge and the effective trailing edge is designated the effective length $M_L$. The effective length $M_L$ is the length that essentially contributes to the signal output in the reading of the recorded marks. To be more specific, the region in the tail on the trailing edge side wherein the width is less than $E_w$ in FIG. 1, for example, does not substantially contribute to the signal output in the reading. It is to be noted that the width $E_w$ used in the calculation of the effective length $M_L$ is the value which has been determined by the inventors of the present invention by means of experiments. It is also to be noted that, in the present invention, the distance between the effective leading edge and the position on the side of the trailing edge where the width starts to decrease is designated the distance $W_L$, and the width at the position at the distance $S_L$ from the effective leading edge is designated the width $S_W$. It is to be noted that, in these definitions, the distances and the lengths are the dimensions measured in the longitudinal direction of the recording track (in the direction of the movement of the beam spot) and the width is the dimension measured in the transverse direction of the recording track.

In the present invention, the first condition to be fulfilled when the recorded marks are formed on a medium operated at a constant angular velocity is that the minimum recorded marks are formed so that $W_L/M_L$ decreases incrementally (in step-by-step manner) or gradually (in continuous manner) from the radially inner side to the radially outer side of the medium. By reducing the ratio of the distance $W_L$ between the effective leading edge and the position where the width starts to decrease to the effective length $M_L$ as described above at the position in the medium where the medium is operated at a relatively high linear velocity, erasability of the minimum recorded marks at the position of high linear velocity can be improved with no increase in the crystallization speed of the recording layer, namely, without compromising the storage reliability or the reading stability. A low jitter is thereby realized over the entire area, namely, from the radially inner side to the radially outer side of the medium operated at a constant angular velocity.

In the present invention, the recording is preferably conducted such that, with the first condition as described above being satisfied, the relation:

$$0.1 \leq W_L/M_L \leq 0.7, \text{ and more preferably}$$

$$0.2 \leq W_L/M_L \leq 0.6$$

is also satisfied for the minimum recorded marks formed at a position where the linear velocity is relatively high, and to be more specific, at the position where the linear velocity is at least 8 m/s, and in particular, at least 9.6 m/s. When the shape of the minimum recorded mark is controlled such that the ratio of the distance $W_L$ between the effective leading edge and the position where the width starts to decrease to the effective length $M_L$ does not exceed the predetermined value, the erasability can be efficiently improved. However, when $W_L$ is too short in relation to the $M_L$, the recorded mark will have an unduly reduced area to invite decrease in the CNR (carrier to noise ratio). This is the reason why a lower limit is set for the $W_L/M_L$ as defined above.

In the present invention, the second condition to be fulfilled when the recorded marks are formed on a medium operated at a constant angular velocity is that the minimum recorded marks are formed so that $S_L/M_L$ incrementally or gradually decreases from the radially inner side to the radially outer side of the medium. By reducing the ratio of the signal length $S_L$ to the effective length $M_L$ at the position where the medium is operated at a relatively high linear velocity, erasability of the minimum recorded marks at the position of high linear velocity can be improved with no increase in the crystallization speed of the recording layer, namely, without compromising the storage reliability or the reading stability. A low jitter is thereby realized over the entire area, namely, from the radially inner side to the radially outer side of the medium operated at a constant angular velocity.

In the present invention, the recording is preferably conducted such that, with the second condition as described above being satisfied, the relation:

$$0.61 \leq S_L/M_L \leq 0.8, \text{ and more preferably}$$

$$0.65 \leq S_L/M_L \leq 0.78$$

is also satisfied for the minimum recorded marks formed at a position where the linear velocity is relatively high, and to be more specific, at the position where the linear velocity is at least 8 m/s, and in particular, at least 9.6 m/s. When the effective length $M_L$ is increased such that the ratio of the signal length $S_L$ to the effective length $M_L$ does not exceed the predetermined value, the erasability can be efficiently improved. However, when the effective length $M_L$ is too long in relation to the signal length $S_L$, the medium will suffer from an unduly increased jitter, and this is the reason why a lower limit is set for the $S_L/M_L$ as defined above.

In the present invention, the third condition to be fulfilled when the recorded marks are formed on a medium operated at a constant angular velocity is that the minimum recorded marks are formed so that $S_W/M_W$ incrementally or gradually decreases from the radially inner side to the radially outer side of the medium. By reducing the ratio of the width $S_W$ at the position where the distance from the effective leading edge is $S_L$ to the maximum width $M_W$ as described above at the position wherein the medium is operated at a relatively high linear velocity, erasability of the minimum recorded marks at the position of high linear velocity can be improved with no increase in the crystallization speed of the recording layer, namely, without compromising the storage reliability or the reading stability. A low jitter is thereby realized over the entire area, namely, from the radially inner side to the radially outer side of the medium operated at a constant angular velocity.

In the present invention, the recording is preferably conducted such that, with the third condition as described above being satisfied, the relation:

$$0.1 \leq S_W/M_W \leq 0.8; \text{ more preferably}$$

$$0.2 \leq S_W/M_W \leq 0.7; \text{ and still more preferably}$$

$$0.3 \leq S_W/M_W \leq 0.6$$

is also satisfied for the minimum recorded marks formed at a position where the linear velocity is relatively high, and to be more specific, at the position where the linear velocity is at least 8 m/s, and in particular, at least 9.6 m/s. When the shape of the minimum recorded mark is controlled such that the trailing edge side of the recorded mark has a reduced width so that the ratio of the width $S_W$ to the maximum width $M_W$ does not exceed the predetermined value, the erasability can be improved with no marked increase in the jitter. However, when the width $S_W$ is too small in relation to the maximum width $M_W$, the recorded mark will have an unduly reduced area to invite decrease in the CNR. This is the reason why a lower limit is set for the $S_W/M_W$ as defined above.

Next, incremental or gradual decrease of the $W_L/M_L$, $S_L/M_L$ and $S_W/M_W$ under each of the conditions as described above is described in detail.

In the case of a medium operated at a constant angular velocity, the linear velocity in the overwriting operation increases continuously from the radially inner side to the radially outer side of the medium. The characteristic feature of the present invention is that the decrease in the erasability associated with the increase in the linear velocity has been suppressed by reducing the $W_L/M_L$, $S_L/M_L$ or $S_W/M_W$. For this purpose, the $W_L/N_L$, $S_L/M_L$ and $S_W/M_W$ may be regulated in a continuous manner in accordance with the linear velocity. However, sufficient effects are achieved as a matter of fact even if the $W_L/M_L$, $S_L/M_L$ and $S_W/M_W$ were regulated in an incremental manner, and such incremental regulation is more preferable than the continuous regulation since the regulation can be accomplished by a simpler mechanism. In regulating the $W_L/M_L$, $S_L/M_L$ and $S_W/M_W$ in an incremental manner in the medium operated at a constant angular velocity, the medium may be segmented into a plurality of zones based on the linear velocity between the minimum linear velocity and the maximum linear velocity, and an adequate $W_L/M_L$, $S_L/M_L$ and $S_W/M_W$ may be allotted to each of the thus defined zones. It is to be noted that the zoning based on the linear velocity may be done so that each zone has the same width while it is also acceptable to define zones each having different widths.

When a disk-shaped medium having a diameter of about 12 cm is operated at a constant angular velocity, the ratio of the linear velocity between the innermost track and the outermost track is normally in the range of 2 to 3, and typically about 2.5. In such a case, the medium may be divided on the bases of the linear velocity into two or more zones, and preferably into three or more zones between the minimum linear velocity and the maximum linear velocity, and an adequate $W_L/M_L$, $S_L/M_L$ and $S_W/M_W$ may be allotted to each of the thus defined zones. The merits of the present invention are not fully realized when the number of zones defined is too small. On the other hand, there is no need to increase the zone number beyond 40 since no significant additional merits of the invention are expected by further increasing the number.

Of the first, the second, and the third conditions as described above, it is preferable in the present invention that at least one, more preferably at least two, and most preferably all of the three conditions are satisfied, and it is particularly important that at least the first condition is satisfied.

The present invention wherein the dimensional ratio of the minimum recorded mark is adequately regulated on the bases of the linear velocity is most effective when there is a large difference between the maximum linear velocity and the minimum linear velocity in the overwriting operation, and to be more specific, when the maximum linear velocity $V_{max}$ and the minimum linear velocity $V_{min}$ in the medium operated at a constant angular velocity are such that:

$4.5 \text{ m/s} \leq V_{max} - V_{min}$, and in particular, $5.4 \text{ m/s} \leq V_{max} - V_{min}$.

In the present invention, a sufficiently high erasability is realized over the entire area of the medium without compromising the storage reliability and the reading stability in the recording format wherein the difference in the linear velocity within the medium is large. However, realization of a sufficiently high erasability over the entire area of the medium is difficult when the difference of the linear velocity is too large, and therefore, the linear velocity is preferably such that:

$V_{max} - V_{min} \leq 30$ m/s, and more preferably $V_{max} - V_{min} \leq 25$ m/s.

In the case of the medium operated at a constant angular velocity, the maximum linear velocity $V_{max}$ of the medium is also high when the minimum linear velocity $V_{min}$ of the medium is high. Therefore, the present invention is particularly effective when the minimum linear velocity $V_{min}$ is high, and to be more specific, when the $V_{min}$ is such that:

$4 \text{ m/s} \leq V_{min}$.

The present invention is also particularly effective when the length $S_L$ of the minimum signal is such that:

$S_L \leq 350$ nm, and in particular, $S_L \leq 250$ nm.

In present invention, the erasability of the minimum recorded marks are mainly controlled by regulating the length of the tail in the of "ginkgo leaf"shape as shown in FIG. 1. When the length $S_L$ of the minimum signal is long, the ratio of the length of the tail in relation to the minimum recorded mark length will be reduced, and it will be difficult to realize the merits of the invention by controlling the length of the tail. However, stable formation of the recorded marks having the desired shape and dimensional ratio will also be difficult the length $S_L$ of the minimum signal is excessively short, and therefore, the length $S_L$ of the minimum signal is preferably such that:

70 nm $\leq S_L$, and in particular, 120 nm $\leq S_L$.

In the case of the CAV system, the length $S_L$ of the minimum signal increases monotonically from the radially inner side to the radially outer side of the medium since the standard clock frequency in the recording is constant. On the other hand, in the case of the MCAV system, the standard clock frequency is incrementally increased from the radially inner side to the radially outer side of the medium in order to increase the recording capacity. To be more specific, a plurality of concentric annular zones are defined on the medium, and the standard clock frequency is kept at a constant value within each zone. The standard clock frequency in each zone is typically determined such that, the length $S_L$ of the minimum signal in the innermost track of each zone is equal for every zone. As a consequence, the length $S_L$ of the minimum signal in each zone increases monotonically from the radially inner side to the radially outer side within the zone, while it increases in serrated pattern from the radially inner side to the radially outer side in terms of the entire medium. As a consequence, the length $S_L$ of the minimum signal in the MCAV system is substantially constant from the radially inner side to the radially outer side of the medium except for the small fluctuation in within each zone. Therefore, the present invention which is particularly effective when the length $S_L$ of the minimum signal does not exceed the particular value is most effective when it is applied to the MCAV system.

In the medium operated at a constant angular velocity, the difference between the maximum data transfer rate and the minimum data transfer rate will be large, and the minimum data transfer rate will be high, when the minimum linear velocity $V_{min}$ is high as described above, the difference between the maximum linear velocity $V_{max}$ and the minimum linear velocity $V_{min}$ is large as described above, and the length $S_L$ of the minimum signal is substantially constant and short. The present invention is particularly effective when the minimum data transfer rate $R_{min}$ and the maximum data transfer rate $R_{max}$ are such that:

30 Mbps $\leq R_{max} - R_{min}$, and

30 Mbps $\leq R_{min}$.

The present invention is capable of suppressing the jitter (clock jitter) to up to 10% over the entire area of the medium even when the difference in the transfer rate ($R_{max} - R_{min}$) is large as described above, and the minimum transfer rate $R_{min}$ is high as described above. The $R_{max}$ and the $R_{min}$, however, are preferably such that:

$R_{max} - R_{min} \leq 200$ Mbps, $R_{min} \leq 150$ Mbps, and the reason for this is the same as the reason for the limitation of the difference in the linear velocity and the minimum linear velocity.

Although the present invention has been described in the foregoing for the case wherein the present invention is applied to a medium operated at a constant angular velocity, the present invention is also applicable to recording formats such as CLV (Constant Linear Velocity) and MCLV (Modified CLV) systems wherein the angular velocity is not constant. In the CLV system, the standard clock frequency is kept constant in the recording, and at the same time, the rotation speed of the medium is controlled so that the linear velocity will be constant over the entire area of the medium. As a consequence, the length $S_L$ of the minimum signal is constant over the entire area of the medium. On the other hand, in the case of MCLV system, the standard clock frequency is kept constant in the recording, and at the same time, the rotation speed of the medium is incrementally reduced from the radially inner side to the radially outer side of the medium. To be more specific, a plurality of concentric annular zones are defined on the medium, and the rotation speed of the medium is kept constant within each zone. The rotation speed of each zones is typically determined such that the linear velocity of the innermost track is equal for all zones, and therefore, the length $S_L$ of the minimum signal in the innermost track is equal for all zones as in the case of the MCAV. Consequently, the linear velocity and the length $S_L$ of the minimum signal in the MCLV system becomes substantially constant from the radially inner side to the radially outer side of the medium except for the small fluctuation in each zone.

In the format such as CLV and MCLV wherein the medium is rotated at a constant or substantially constant linear velocity, the present invention is most effective when a recording layer of relatively low crystallization speed is overwritten at a relatively high linear velocity. In such a case, the minimum recorded marks are formed in the shape of "ginkgo leaf", and such that at least one, preferably at least two, and more preferably all of the $W_L/M_L$, $S_L/M_L$, and $S_W/M_W$ are within the ranges as specified above, and in particular, such that at least the $W_L/M_L$ is within the preferable range as specified above. The erasability at a high linear velocity will be then improved with no increase in the crystallization speed of the recording layer, namely, without compromising the storage reliability or the reading stability, and without inviting a significant increase in the jitter. An overwriting operation at a high speed is thereby enabled for the entire area of a medium which already enjoy satisfactory storage reliability and good reading stability.

In the format such as CLV and MCLV wherein the medium is rotated at a constant or substantially constant linear velocity, the present invention is most effective when the linear velocity is at least 8 m/s, and in particular, at least 9.6 m/s over the entire area of the medium.

As described above, the present invention is effective when the linear velocity of the medium in the overwriting operation is relatively high. However, an excessively high linear velocity invites increase in the cost of the drive unit, loss of the stability of the medium, and the like. In view of such situation, the linear velocity V is preferably such that:

$V \leq 35$ m/s, and more preferably $V \leq 30$ m/s for the of the medium irrespective of the format employed.

Next, methods which may be appropriate for forming the recorded marks having the shape and the dimensional ratios as defined above are described.

As described above, the phase change optical recording medium is overwritten by irradiating the medium with a laser beam which is power-modulated at least between the recording power level and the erasing power level. When the medium is irradiated by the laser beam at the recording power level, the region of the recording layer irradiated by the laser beammelts. The power of the laser beam then decreases to the erasing power level after a predetermined irradiation period so that the molten region is quenched to become amorphous. In the present invention, recorded marks having the trailing edge of the shape as described above are formed by amorphizing not all of the molten region and allowing some of the molten region to be crystallized in the course of the recorded mark formation. To be more specific, the trailing edge side of the recorded mark is crystallized by slowing down the cooling rate of the molten region on the trailing edge side (which is the side of the laser beam destination). In this process, the recording pulse strategy and the power of irradiation are regulated to enable the formation of the minimum recorded marks having the shape as shown in FIG. 1 and the dimensional ratios as defined above ($W_L/M_L$, $S_L/M_L$ and $S_W/M_W$).

Crystallization of some part of the molten region in the formation of the recorded marks is already described in JP-A7176/1997. To be more specific, JP-A7176/1997 describesthat recrystallization takes place in the leading edge half of the recorded marks when the optical recording disk is operated at a low linear velocity, and suggests that such recrystallization may be prevented by irradiating the medium with a laser beam of recording power level in a pulse train of particular pattern. JP-A 7176/1997 also describes the mechanism of such recrystallization. According to JP-A 7176/1997, the heat generated in the region corresponding to the trailing edge half of the recorded mark by the irradiation of such region with the laser beam is conducted to the region corresponding to the leading edge half of the recorded mark which has already melted, and rapid cooling of such region is inhibited to result in the recrystallization of such region. The recrystallization caused by such mechanism described in the JP-A 7176/1997 is referred to as "selferase" in JP-A 232697/1999. As disclosed in these publications, it is known that leading edge side of the molten region undergoes the "selferase" to become crystallized, and that such crystallization affects the shape of the leading edge side of the recorded marks. However, as disclosed in JP-A 7176/1997, the prime interest in the prior art has been avoiding of the "selferase" to have any effects on the shape of the recorded marks.

As opposed to such prior art, the trailing edge side of the recorded marks is formed in the present invention into the shape as shown in FIG. 1 by intentionally inducing the phenomenon similar to such selferase in the trailing edge side of the molten region in order to crystallize the trailing edge side of the molten region. The selferase phenomenon may be induced in the trailing edge side of the molten region, for example, by controlling the power and duration of the laser beam irradiated to the region in the rear side of the recorded mark. The heat applied by the laser beam irradiated to such region in the rear side of the recorded mark is conducted to the trailing edge side of the molten region, and therefore, the cooling speed of the trailing edge side of the molten region will be regulated by controlling the power and the duration of the laser beam irradiated to the region in the rear side of the recorded mark, and as a result, the length of the crystalline region in the trailing edge side of the molten region is simultaneously regulated. When the selferase phenomenon is induced in the trailing edge side of the molten region, crystallization mainly takes place in the lengthwise direction of the recorded mark, and scarcely in the width direction. Accordingly, a recorded mark having a relatively small width with a relatively large length can be formed by adequately controlling the level of the power used in the recording, and thereafter, crystallizing the trailing edge side of the molten region by selferase to thereby form the recorded mark having the shape of the trailing edge side as shown in FIG. 1.

Figure 2:
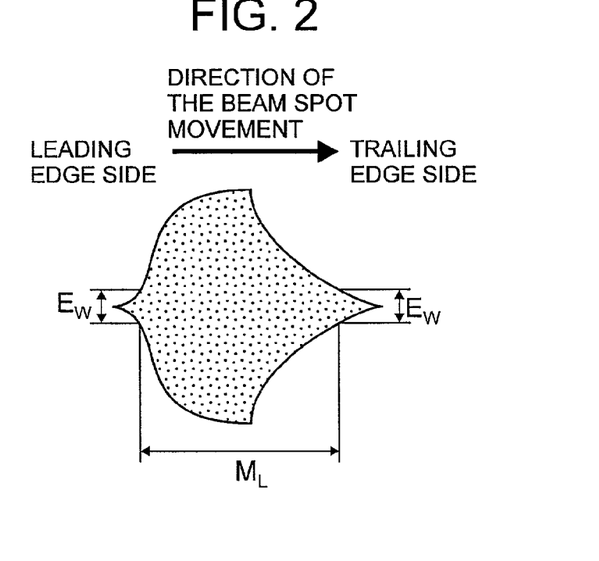
FIG. 2 is a schematic view showing another recorded mark.

In contrast, if the selferase phenomenon is not utilized in the formation of the trailing edge of the , the trailing edge of the recorded marks formed will have a rounded shape like the leading edge of the recorded mark as shown in FIG. 2 of JP-A 7176/1997. When the length of the recorded mark is increased to a length greater than the signal length in such a case, the area of the recorded mark may become increased, and in spite of such increase in the area of the recorded mark, the medium will suffer from significantly increased jitter and frequent errors.

It is to be noted that the tail as shown in FIG. 1 is believed to have been generated by the energy distribution in the laser beam spot which resembles Gaussian distribution. To be more specific, the energy density is high near the center of the beam spot, and accordingly, the temperature reached is relatively high near the center of the recording track and the cooling speed is also relatively high. As a consequence, the area near the center of the recording track is less likely to be affected by the selferase compared to the edge portions of the recording track. This phenomena is most prominent when the linear velocity used in the recording of the medium is relatively high, namely, when the cooling speed of the recording layer after the irradiation of the recording beam is relatively high.

Figure 3:
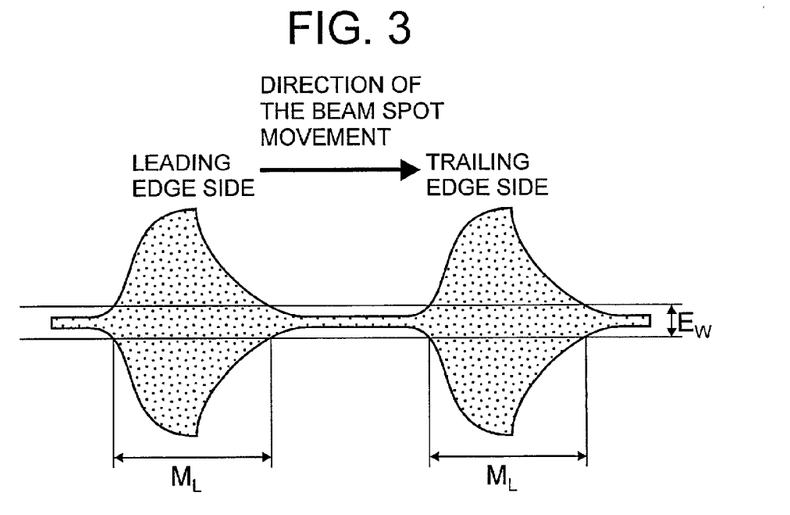
FIG. 3 is a schematic view showing another recorded mark.

In the present invention, the recorded marks may also have the shapes as shown in FIGS. 2 and 3, respectively. The recorded mark shown in FIG. 2 has a nose on the leading edge, and the nose protrudes toward the direction opposite to the trailing edge. The recorded marks shown in FIG. 3 are connected to each other by their tail and nose, and in other words, the recorded marks of "ginkgo leave" shape which are aligned along the longitudinal direction of the recording track are connected by an amorphous band. The effective length $M_L$ of the recorded mark is defined by the width $E_W$ in the recorded marks of the shapes shown FIGS. 2 and 3 as in the case of the shape of the recorded mark shown in FIG. 1.

It should be noted that JP-A 231725/2000 which is an invention of the applicants of the present invention discloses an optical recording method wherein minimum recorded marks are formed such that at least a part of the trailing edge protrudes toward the leading edge. This method is similar to the present invention in that the trailing edge side of the molten region is crystallized by selferase in the process of forming the recorded marks. This method is also similar to the present invention in that the recorded marks formed by this method has a shape with a tail at or near the center of its trailing edge which protrudes in the direction of the recording track (a shape like "a bat with expanded wings" as expressed in JP-A 231725/2000) as disclosed in paragraph 0013 of JP-A 231725/2000. JP-A 231725/2000, however, is silent about the medium operated at a constant angular velocity, and regulation of the recorded mark shape based on the linear velocity. Furthermore, recording in the Examples of JP-A 231725/2000 is carried out at a low speed (i.e. at a linear velocity of 3.5 m/s), and the minimum recorded marks in these Examples all have a short and extremely thin tail as expressed by the relations:

$$0.86 < S_L/M_L,$$

$$0.7 < W_L/M_L.$$

Accordingly, the merits of the present invention are not realized in the invention described in JP-A 231725/2000.

Next, the method which may be actually employed in regulating the selferase phenomenon in the trailing edge side of the molten region is described.

Figure 4:
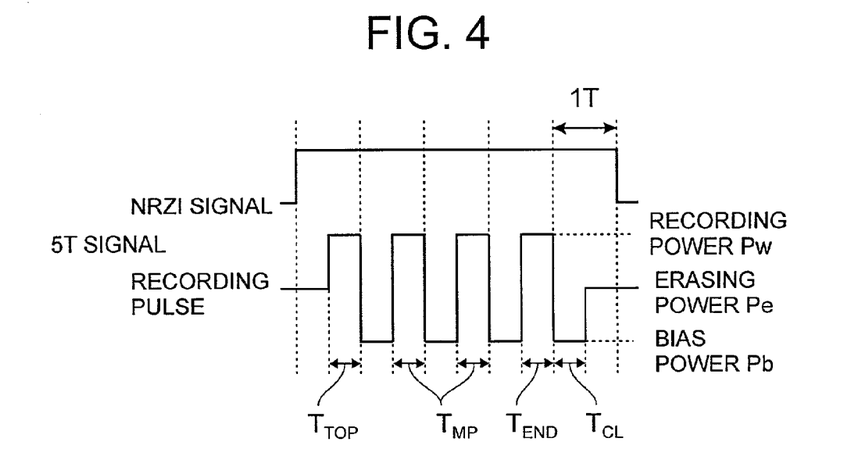
FIG. 4 is a schematic view showing an embodiment of the recording pulse strategy.

First, the recording pulse strategy is described. A phase change optical recording medium is generally recorded, not by continuously irradiating the medium with the recording laser beam for the duration corresponding to the length of the recorded mark, but by irradiating the medium with the laser beam divided in a pulse train comprising a plurality of pulses for the control of the recorded mark shapes as described in JP-A 7176/1997. The specific constitution of the pulse division is generally referred to as the recording pulse strategy. An embodiment of the recording pulse strategy is shown in FIG. 4 wherein a typical recording pulse train corresponding to 5T signal of NRZI signal is illustrated. In FIG. 4, $T_{TOP}$ represents the width of the top upward pulse, $T_{END}$ represents the width of the last upward pulse, $T_{MP}$ represents the width of the pulses other than the top and the last pulses, and $T_{CL}$ represents the width of the downward pulse (also referred to as the cooling pulse) after the last upward pulse. Such pulse width is generally indicated by the value normalized in terms of the standard clock width (1T). In the recording pulse strategy shown in FIG. 4, power (bias power $P_b$) of all of the downward pulses including the cooling pulse is set at a value lower than the erasing power $P_e$.

When the power of the laser beam is modulated by the recording pulse strategy as described above, the selferase phenomenon on the trailing edge side of the molten region can be regulated by controlling at least one of the recording power $P_W$, $T_{MP}$, $T_{END}$, power of the cooling power (bias power $P_b$ in the illustrated embodiment), $T_{CL}$ and the erasing power $P_e$. Although the control scheme may be adequately selected depending on the composition of the recording layer, the structure of the medium, and other factors relevant to the crystallization of the molten region, it is generally preferable to regulate at least one of the recording power $P_w$, the erasing power $P_e$, and $T_{CL}$.

Figure 5:
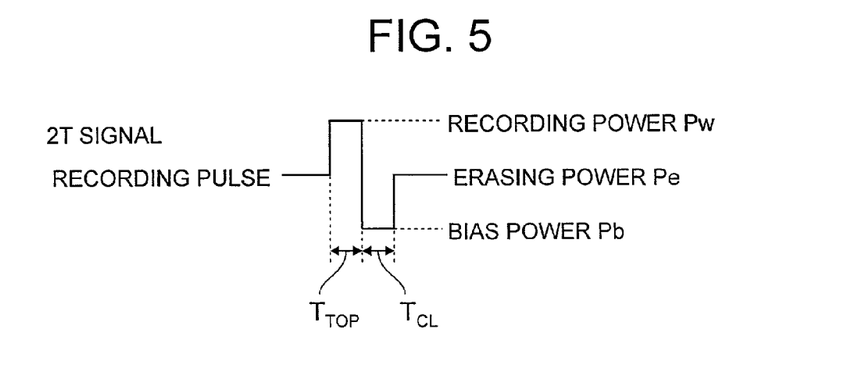
FIG. 5 is a schematic view showing another embodiment of the recording pulse strategy.

The present invention is particularly effective for the case of overwriting at a high linear velocity, and it is the shape and the dimensions of the minimum recorded mark that are regulated in the present invention. In the formation of the minimum recorded mark at a high linear velocity, pulse division of the laser beam is either difficult or utterly impossible due to the limitation set by the laser diode responsivity. In view of such situation, a pulse train used has only one upward pulse as in the case of 2T signal shown in FIG. 5, and in such a case, it is only the $T_{TOP}$, the $T_{CL}$ and the power that are regulated. To be more specific, the regulation is preferably conducted such that, with the increase in the linear velocity, by either reducing the width $T_{CL}$ of the last downward pulse, or increasing the power level of the last downward pulse ($P_b$ in the drawings) to the level near the erasing power $P_e$, or by conducing both the reduction of the $T_{CL}$ and the increase of the $P_b$. $T_{CL}$ may be reduced to 0.

It is to be noted that the regulation of the $T_{CL}$ in accordance with the linear velocity is described, for example, in JP-A 132836/2000 and the JP-A 7176/1997 as mentioned above. However, such regulation of the $T_{CL}$ on the bases of the linear velocity had been carried out in the prior art in order to reduce the selferase that becomes significant when the linear velocity is relatively low, and hence, in order to suppress the increase of jitter. In contrast, the regulation of the $T_{CL}$ is conducted in the present invention at a high linear velocity in order to positively promote the selferase on the trailing edge side of the recorded marks to thereby regulate the shape and the dimensions of the recorded marks. The erasability at the high linear velocity is thereby improved with the jitter increase allowed to some degree. As described above, the present invention is utterly different from the prior art, and it has been utterly unknown to regulate the shape and the dimensions of the recorded marks in the way as defined in the present invention.

Next, embodiments of the optical recording medium to which the present invention may be applied are described.

Figure 6:
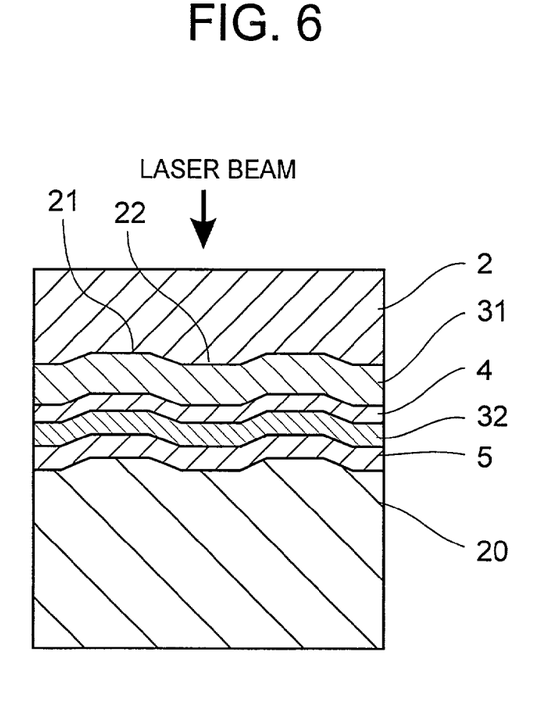
FIG. 6 is a cross sectional view of the optical recording medium according to an embodiment of the present invention.

Structure Shown in FIG. 6

This optical recording medium comprises a supporting substrate 20, and a reflective layer 5 comprising a metal or a semimetal, a second dielectric layer 32, a recording layer 4, a first dielectric layer 31, and a light-transparent substrate 2 deposited on the supporting substrate 20 in this order. The recording/reading laser beam enters the medium through the light-transparent substrate 2. It should be noted that an intermediate layer comprising a dielectric material may be optionally provided between the supporting substrate 20 and the reflective layer 5.

Supporting Substrate 20

The supporting substrate 20 is provided for the purpose of maintaining the rigidity of the medium. The thickness of the supporting substrate 20 is generally in the range of 0.2 to 1.2 mm, and preferably, in the range of 0.4 to 1.2 mm, and the supporting substrate 20 may be either transparent or non-transparent. Although the supporting substrate 20 may comprise a resin as in the case of typical optical recording medium, the supporting substrate 20 may also comprise a glass. The guide grooves 21 generally provided in the optical recording medium may be provided in the present invention by transcription of the configuration of the grooves formed in the supporting substrate 20 to the layers formed thereon as shown in the drawings. The grooves 21 are the areas located closer to the side of the laser beam incidence, and the raised areas defined between two adjacent grooves are the lands 22.

Reflective Layer 5

In the present invention, the reflective layer may be formed from any desired material, and typically, from a metal or a semimetal such as Al, Au, Ag, Pt, Cu, Ni, Cr, Ti or Si as a simple substance or as an alloy containing at least one of such metals.

The reflective layer is typically deposited to a thickness of 10 to 300 nm. The reflectivity is less likely to be sufficient when the thickness is below such range, and deposition to a thickness beyond such range is economically disadvantageous since no substantial improvement in the reflectivity is attained by additional increase in the thickness. The reflective layer is preferably formed by vapor deposition such as sputtering and evaporation.

First Dielectric Layer 31 and Second Dielectric Layer 32

These dielectric layers prevent oxidation and degradation of the recording layer, and also, protect the supporting substrate 20 or the light-transparent substrate 2 from the heat transmitted from the recording layer during the recording by blocking the heat or by dissipating such heat in in-plane direction of the layer. Provision of the dielectric layers also contributes for improving the degree of modulation. Each dielectric layer may also comprise a laminate of two or more dielectric layers each having different compositions.

The dielectric material used for these dielectric layers is preferably a compound containing at least one metal component selected from Si, Ge, Zn, Al, and rare earth elements, and the compound is preferably an oxide, a nitride, or a sulfide. A mixture containing two or more of the foregoing may also be used.

The thickness of the first and the second dielectric layers may be adequately determined so that sufficient improvement in the protection and degree of modulation are achieved. However, the first dielectric layer 31 is preferably deposited to a thickness of 10 to 300 nm, and more preferably to a thickness of 50 to 250 nm, and the second dielectric layer 32 is preferably deposited to a thickness of 10 to 100 nm.

The dielectric layers are preferably formed by sputtering.

Recording Layer 4

The recording layer is not particularly limited for its composition, and the material used may be adequately selected from various phase change materials, and preferably, from those containing at least Sb and Te. However, crystallization temperature of the recording layer containing Sb and Te as the only components is as low as about 130° C., and the storage reliability is insufficient. For the increase in the crystallization temperature, the recording layer may preferably comprise elements other than Sb and Te. Such element is preferably at least one element selected from In, Ag, Au, Bi, Se, Al, P, Ge, H, Si, C, V, W, Ta, Zn, Ti, Sn, Pb, Pd, and rare earth elements (Sc, Y, and lanthanoids), and among these, the preferred is at least one element selected from rare earth elements, Ag, In, and Ge in view of the particularly high effect in improving the storage reliability.

Preferably, the composition containing Sb and Te as its main components is the one as described below, namely, the composition represented by the formula (I):

$$(Sb_xTe_{1-x})_{1-y}M_y \quad (I)$$

wherein M represents the element other than Sb and Te, and atomic ratio of the elements constituting the recording layer is preferably such that:

$0.2 \leq x \leq 0.90$, and $0 \leq y \leq 0.25$.

and more preferably, $0.55 \leq x \leq 0.85$, and $0.01 \leq y \leq 0.20$.

When x representing the content of Sb is too small in the formula (I), crystallization speed will be excessively low, and signal output will be reduced due to the decrease in reflectivity of the recording layer in the crystalline area. In addition, when x is extremely low, recording will be difficult. On the other hand, when x is too large, difference in reflectivity between the crystalline phase and the amorphous phase will be insufficient.

The element M is not particularly limited. However, it is preferable to select at least one member from the above-indicated elements for the M in view of storage reliability. The y representing the content of the element M is preferably within the above-specified range since an excessively large y results in the reduced crystallization speed.

The recording layer is preferably formed to a thickness of more than 4 nm to 50 nm, and more preferably, to a thickness of 5 nm to 30 nm. When the recording layer is too thin, growth of the crystalline phase will be difficult to render the crystallization difficult. When the recording layer is too thick, the recording layer will have an increased heat capacity to render the recording difficult. An excessively thick recording layer also results in the reduced output of the signal.

The recording layer is preferably formed by sputtering.

Light-transparent Substrate 2

The light-transparent substrate 2 has a sufficient transparency for recording/reading laser beam to pass therethrough. The light-transparent substrate 2 may comprise a resin plate or a glass plate of the thickness substantially equivalent to that of the supporting substrate 20. However, when the high recording density is to be achieved by increasing the NA of the recording/reading optical system, the thickness of the light-transparent substrate 2 is preferably reduced. The thickness of the light-transparent substrate is preferably in the range of 30 to 300 $\mu$m. When the light-transparent substrate is too thin, the medium will suffer from the optical effects caused by the dust on the surface of the light-transparent substrate. An excessively thick light-transparent substrate, on the other hand, will result in the difficulty of enabling the high density recording by increasing the NA.

The light-transparent substrate 2 of reduced thickness may be provided, for example, by adhering a light-transparent sheet comprising a light-transparent resin on the first dielectric layer 31 by means of an adhesive or pressure-sensitive adhesive, or by directly forming the light-transparent resin layer on the first dielectric layer 31 by coating.

In the present invention, the land and/or the groove may be used for the recording track.

Figure 7:
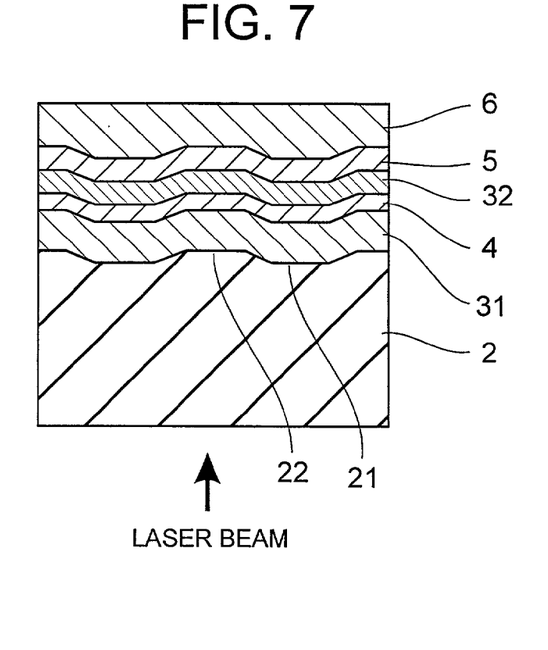
FIG. 7 is a cross sectional view of the optical recording medium according to another embodiment of the present invention.

Structure Shown in FIG. 7

FIG. 7 shows an embodiment of the optical recording medium which comprises a light-transparent substrate 2, and a first dielectric layer 31, a recording layer 4, a second dielectric layer 32, a reflective layer 5, and a protective layer 6 deposited on the light-transparent substrate 2 in this order. The laser beam enters the medium through the light-transparent substrate 2.

The light-transparent substrate 2 of FIG. 7 may comprise a layer similar to the supporting substrate 20 of FIG. 6. The light-transparent substrate 2, however, should be capable of transmitting the light.

The protective layer 6 is provided for improving scratch resistance and corrosion resistance. Preferably, the protective layer is formed of an organic material, and typically, a radiation curable compound or a composition thereof which has been cured with radiation such as electron or UV radiation. The protective layer may generally have a thickness of about 0.1 to about 100 $\mu$m, and may be formed by conventional techniques such as spin coating, gravure coating, spray coating, and dipping.

Other layers are similar to the embodiment shown in FIG. 6.

EXAMPLES

Example 1

A sample of optical recording disk having the structure as shown in FIG. 6 was produced by the procedure as described below.

A supporting substrate 20 in the form of a disk having a diameter of 120 mm and a thickness of 1.2 mm was prepared by injection molding polycarbonate. Grooves were simultaneously formed in the injection molding of the supporting substrate 20. The recording track pitch in the land/groove recording system was 0.30 $\mu$m.

The reflective layer 5 was formed by sputtering in argon atmosphere by using $Ag_{98}Pd_1Cu_1$ for the target. The reflective layer was formed to a thickness of 100 nm.

The second dielectric layer 32 was formed by sputtering in argon atmosphere using $Al_2O_3$ for the target. The second dielectric layer was formed to a thickness of 20 nm.

The recording layer 4 was formed by sputtering in argon atmosphere using an alloy target. The recording layer had a composition (atomic ratio) of $(Sb_{0.78}Te_{0.22})_{0.95}In_{0.01}Ge_{0.04}$ The recording layer was formed to a thickness of 12 nm.

The first dielectric layer 31 was formed by sputtering in argon atmosphere using ZnS (80 mole %)—$SiO_2$ (20 mole %) for the target. The first dielectric layer was formed to a thickness of 130 nm.

The light-transparent substrate 2 was disposed on the surface of the first dielectric layer 31 by adhering a polycarbonate sheet of 100 $\mu$m thick to the first dielectric layer 31 with an intervening adhesive layer of 3 $\mu$m thick comprising a solvent-base UV curable acrylic resin.

The recording layer of the sample was initialized (crystallized) on a bulk eraser, and the sample was recorded by rotating the sample at a constant angular velocity under the conditions:

laser beam wavelength: 405 nm,
numerical aperture, NA: 0.85, and
modulation code: (1,7) RLL.

The linear velocity used in the recording is shown in Table 1. It is to be noted that the linear velocity of 11.4 m/s corresponds to the linear velocity at the position of the diameter of 50 mm, and the linear velocity of 5.7 m/s corresponds to the linear velocity at the position of the diameter of 25 mm of the sample rotating at 2178 rpm. The recording pulse strategy was as in the case of the patterns shown in FIGS. 4 and 5 with the number of upward pulses of (n-1) for the nT signal, and other conditions were:

$T_{TOP}$, $T_{MP}$, $T_{END}$, $T_{CL}$: the values shown in Table 1,
$P_w$: 5.0 mW,
$P_e$: the values shown in Table 1, and
$P_b$: 0.1 mW.

It is to be noted that the minimum signal was 2T, and the clock frequency was controlled so that the length ($S_L$) of the 2T signal was 173 nm irrespective of the linear velocity used.

Next, photomicrographs of the recording layer of the sample were taken under transmission electron microscope, and $M_L$, $W_L$, $M_W$, and $S_W$ were measured from the minimum recorded marks in these photomicrographs to calculate $W_L/M_L$, $S_L/M_L$, and $S_W/M_W$. The results are shown in Table 1.

Figure 8:
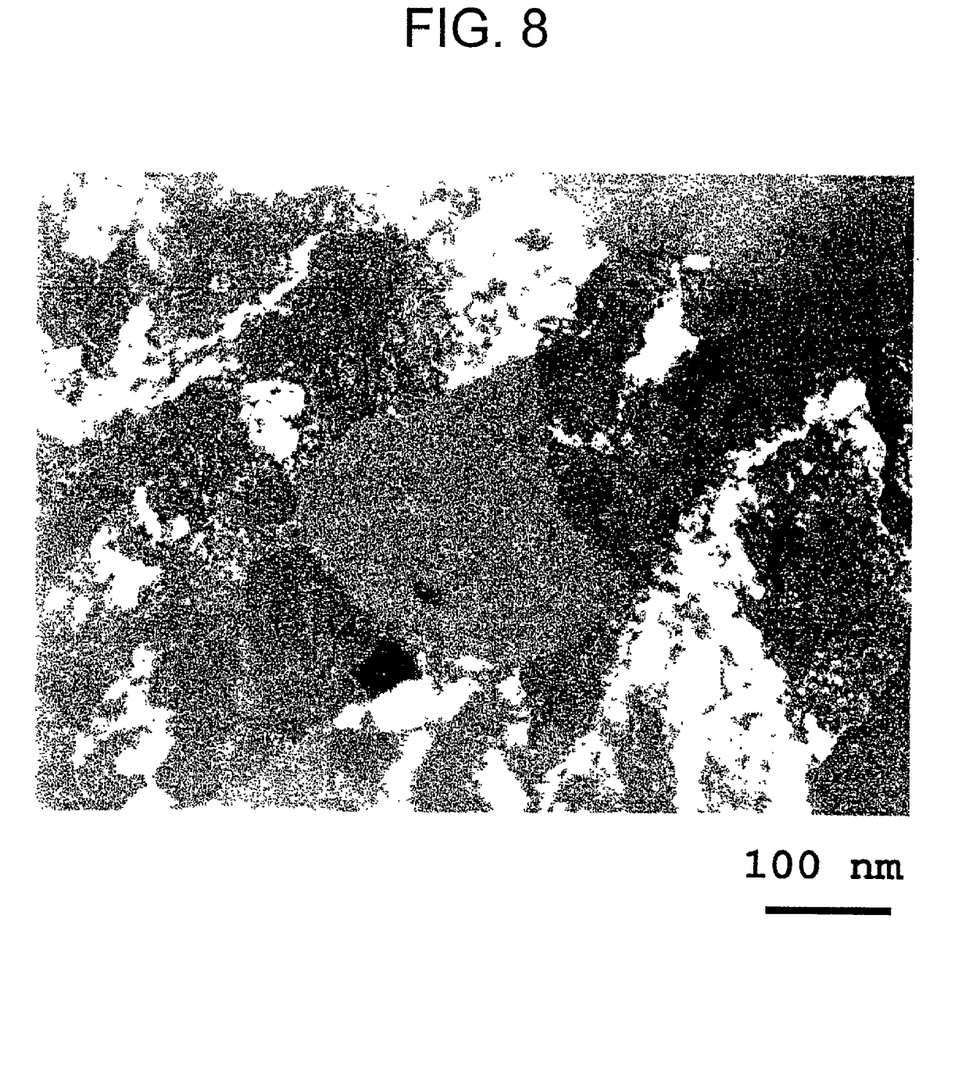
FIG. 8 is a photomicrograph taken by a transmission electron microscope of the phase change recording layer wherein crystalline structure is shown.
Figure 9:
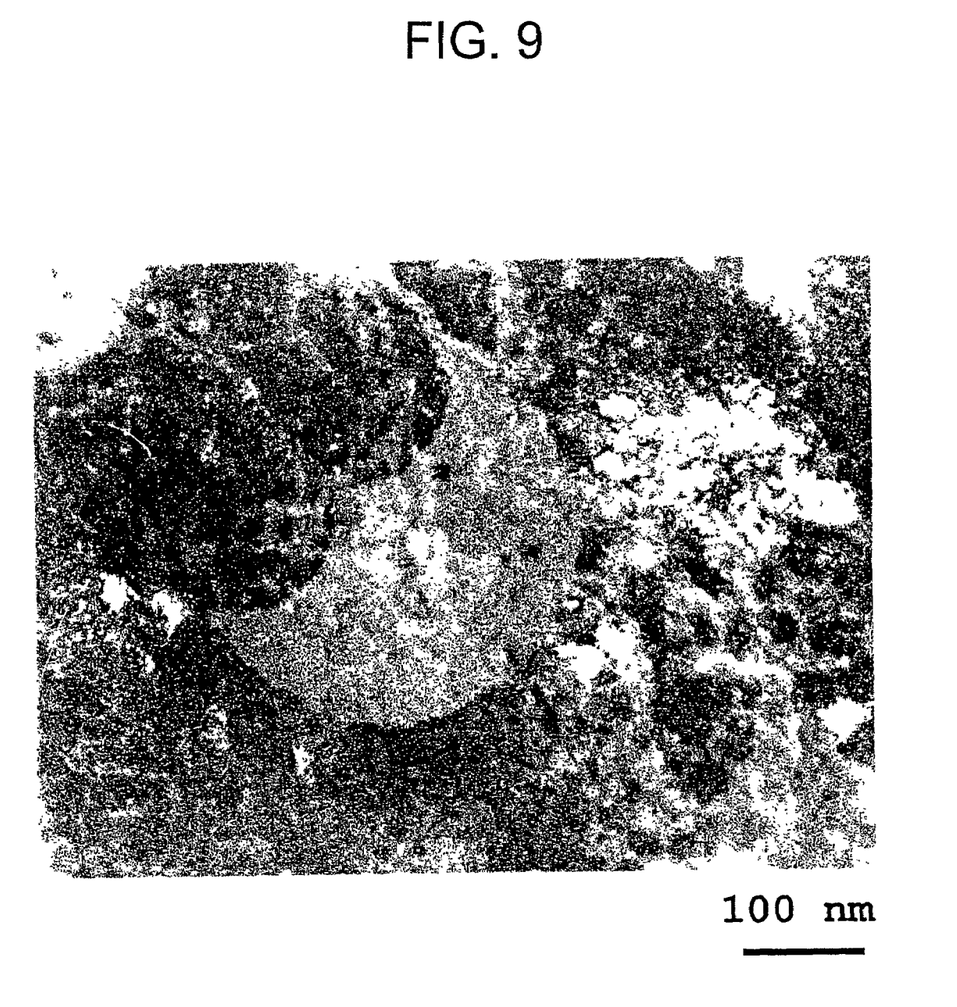
FIG. 9 is another photomicrograph taken by a transmission electron microscope of the phase change recording layer wherein crystalline structure is shown.

FIGS. 8 and 9 are the photomicrographs of the recorded marks formed under the conditions shown in Table 1, Nos. 101 and 103, respectively. In No. 101 wherein the recording had been done by using a pulse strategy including no cooling pulse and at a high linear velocity, the minimum recorded marks were in the shape of "ginkgo leave" and the minimum recorded mark had dimensional ratios within the scope of the present invention. On the other hand, in No. 103 wherein the recording had been done at a low linear velocity, the minimum recorded marks found were in the shape of "bat with expanded wings" as described in JP-A 231725/2000, supra, having the dimensional ratios of various measurements of the recorded mark outside the scope of the present invention. In No. 102, although the recording was done at a high linear velocity as in the case of No. 101, the minimum recorded marks formed were in the shape of "bat with expanded wings" with dimensional radios substantially the same as those of No. 103 since the recording pulse strategy included a relatively wide cooling pulse. It is to be noted that, No. 104 was recorded under the conditions the same as those of No. 103.

Next, the sample was recorded with only 2T signal under the conditions shown in Table 1, and the recorded marks formed were erased by irradiating a direct current laser beam at an output of 1.4 mW while the sample was rotated at the erasing linear velocity shown in Table 1. The sample was then measured for their erasability. It is to be noted the erasability shown in Table 1 is the decrease of the carrier of the 2T signal. A erasability of less than 25 dB can be regarded as "unerasable".

The sample was also recorded with mixed signals of (1,7) RLL modulation under the conditions shown in Table 1, and overwritten with mixed signals of (1,7) RLL modulation while rotating the sample at the erasing linear velocity shown in Table 1. The jitter after the overwriting is shown in Table 1. The jitter shown is clock jitter, and a clock jitter of up to 10% indicates that the signals are readable at a practically acceptable level. It is to be noted that the clock jitter was determined by reading the signal on a time interval analyzer to determine the "signal fluctuation ($\Sigma$)" by $$\Sigma/T_W (\%)$$

wherein $T_w$ represents the window width.

The merits of the present invention are evident from the results shown in Table 1. The minimum recorded marks of Nos. 102, 103, and 104 satisfied the relations:

$$0.86 < S_L/M_L,$$

$$0.7 < W_L/M_L$$

as in the case of the minimum recorded mark described in JP-A 231725/2000, and they were in the shape of "bat with expanded wings" as described in JP-A 231725/2000. As a consequence, the erasability was sufficient in No. 103 wherein the linear velocity used in the erasing was as low as 5.7 m/s while the erasability was insufficient when the linear velocity used in the erasing was increased to 11.4 m/s as in the cases of Nos. 102 and 104. In contrast, in No. 101 wherein all of the dimensional ratios (i.e. $W_L/M_L$, $S_L/M_L$, and $S_W/M_W$) of the minimum recorded marks were within the scope of the present invention, the sample exhibited a sufficient erasability at the erasing linear velocity of 11.4 m/s. In addition, the jitter in No. 101 was within the acceptable range although it was slightly larger than that of No. 103 wherein the recording and the erasing were done at the low linear velocity.

As described above, when the minimum recorded marks are formed as in the case of No. 103, in the area on the radially inner side of the disk operated a lower linear velocity, and as in the case of No. 101, in the area on the radially outer side of the disk operated at a higher linear velocity, the disk will exhibit excellent erasing properties as well as low jitter in the overwriting over its entire area. In such a case, it is also possible to design the crystallization speed of the recording layer to correspond to the low linear velocity of the radially inner side of the disk and, a sufficient storage reliability as well as good reading stability are thereby enabled. Furthermore, if minimum recorded marks are formed as in the case of No. 101 over the entire area of the disk which is rotated at a substantially constant linear velocity, the resulting medium will be provided with a high data transfer rate, and at the same time, with favorable storage reliability and reading stability.

TABLE 1

| No. | Recording linear velocity (m/s) | $S_L$ (nm) | $T_{TOP}$ (T) | $T_{MP}$ (T) | $T_{END}$ (T) | $T_{CL}$ (T) | Pe (mW) | $M_L$ (nm) | $W_L$ (nm) | $M_W$ (nm) | $S_W$ (nm) |
|---|---|---|---|---|---|---|---|---|---|---|---|
| 101 | 11.4 | 173 | 0.4 | 0.4 | 0.5 | 0 | 1.4 | 245 | 100 | 255 | 105 |
| 102 | 11.4 | 173 | 0.6 | 0.5 | 0.5 | 0.7 | 2.0 | 205 | 180 | 290 | 290 |
| 103 | 5.7 | 173 | 0.7 | 0.5 | 0.5 | 0.8 | 2.4 | 200 | 190 | 310 | 310 |
| 104 | 5.7 | 173 | 0.7 | 0.5 | 0.5 | 0.8 | 2.4 | 200 | 190 | 310 | 310 |

| No. | $W_L/M_L$ | $S_L/M_L$ | $S_W/M_W$ | Erasing linear velocity (m/s) | Position in distance from the center (mm) | Data transfer rate (Mbps) | Erasability (dB) | Jitter (%) |
|---|---|---|---|---|---|---|---|---|
| 101 | 0.408 | 0.706 | 0.412 | 11.4 | 50 | 70 | 26.5 | 8.6 |
| 102 | 0.878* | 0.843* | 1.000* | 11.4 | 50 | 70 | 22.4 | 11.5 |
| 103 | 0.950* | 0.865* | 1.000* | 5.7 | 25 | 35 | 30.0 | 7.7 |
| 104 | 0.950* | 0.865* | 1.000* | 11.4 | 50 | 70 | 20.0 | 12.5 |

*outside the scope of the invention

Example 2

The sample of the optical recording disk produced in Example 1 was also evaluated as in the case of Example 1 by conducting the recording, erasing, and overwriting under the conditions shown in Tables 2 and 3, respectively. The results are shown in Tables 2 and 3, respectively.

TABLE 2

| No. | Recording linear velocity (m/s) | $S_L$ (nm) | $T_{TOP}$ (T) | $T_{MP}$ (T) | $T_{END}$ (T) | $T_{CL}$ (T) | Pe (mW) | $M_L$ (nm) | $W_L$ (nm) | $M_W$ (nm) | $S_W$ (nm) |
|---|---|---|---|---|---|---|---|---|---|---|---|
| 201 | 5.7  | 173 | 0.7 | 0.5  | 0.5 | 0.8 | 2.4 | 200 | 190 | 310 | 310 |
| 202 | 7.4  | 173 | 0.6 | 0.45 | 0.5 | 0.6 | 2.2 | 216 | 169 | 302 | 259 |
| 203 | 8.1  | 173 | 0.6 | 0.45 | 0.5 | 0.5 | 1.9 | 220 | 152 | 301 | 231 |
| 204 | 9.7  | 173 | 0.5 | 0.4  | 0.5 | 0.3 | 1.7 | 236 | 128 | 283 | 162 |
| 205 | 11.4 | 173 | 0.4 | 0.4  | 0.5 | 0   | 1.4 | 245 | 100 | 255 | 105 |
| 206 | 14.0 | 173 | 0.4 | 0.35 | 0.5 | 0   | 1.2 | 261 | 91  | 244 | 91  |

| No. | $W_L/M_L$ | $S_L/M_L$ | $S_W/M_W$ | Erasing linear velocity (m/s) | Position in distance from the center (mm) | Data transfer rate (Mbps) | Erasability (dB) | Jitter (%) |
|---|---|---|---|---|---|---|---|---|
| 201 | 0.950* | 0.865* | 1.000* | 5.7  | 24 | 35 | 30.0 | 7.7 |
| 202 | 0.782* | 0.801* | 0.858* | 7.4  | 31 | 45 | 29.5 | 7.5 |
| 203 | 0.691  | 0.786  | 0.767  | 8.1  | 34 | 50 | 29.4 | 7.9 |
| 204 | 0.542  | 0.733  | 0.572  | 9.7  | 41 | 60 | 28.1 | 8.2 |
| 205 | 0.408  | 0.706  | 0.412  | 11.4 | 48 | 70 | 26.5 | 8.6 |
| 206 | 0.349  | 0.663  | 0.373  | 14.0 | 59 | 86 | 25.4 | 8.9 |

*outside the scope of the invention

TABLE 3

| No. | Recording linear velocity (m/s) | $S_L$ (nm) | $T_{TOP}$ (T) | $T_{MP}$ (T) | $T_{END}$ (T) | $T_{CL}$ (T) | Pe (mW) | $M_L$ (nm) | $W_L$ (nm) | $M_W$ (nm) | $S_W$ (nm) |
|---|---|---|---|---|---|---|---|---|---|---|---|
| 301 | 5.7 | 173 | 0.7 | 0.5 | 0.5 | 0.8 | 2.4 | 200 | 190 | 310 | 310 |
| 302 | 8.1 | 173 | 0.7 | 0.5 | 0.5 | 0.8 | 1.9 | 205 | 195 | 300 | 300 |

| No. | $W_L/M_L$ | $S_L/M_L$ | $S_W/M_W$ | Erasing linear velocity (m/s) | Position in distance from the center (mm) | Data transfer rate (Mbps) | Erasability (dB) | Jitter (%) |
|---|---|---|---|---|---|---|---|---|
| 301 | 0.950* | 0.865* | 1.000* | 5.7 | 24 | 35 | 30.0 | 7.7  |
| 302 | 0.951* | 0.868* | 1.000* | 8.1 | 34 | 50 | 24.9 | 10.1 |

*outside the scope of the invention

The merits of the present invention are evident from the results shown in Tables 2 and 3.

To be more specific, in Nos. 201 and 202 of Table 2 wherein the disk had been erased and overwritten at positions with the linear velocity of less than 8 m/s, the erasability was sufficiently high and the jitter was low although the $W_L/M_L$, $S_L/M_L$ and $S_W/M_W$ were outside the scope of the present invention. On the other hand, in Nos. 203 to 206 of Table 2 wherein the disk had been erased and overwritten at a position with the linear velocity of at least 8 m/s, the erasability was also sufficiently high and the jitter was low since the minimum recorded marks had been formed such that the $W_L/M_L$, $S_L/M_L$ and $S_W/M_W$ were within the scope of the present invention. In Table 2, the shape of the recorded marks was controlled in the sample operated at a constant angular velocity so that all of the $W_L/M_L$, $S_L/M_L$ and $S_W/M_W$ decreased from the radially inner side to the radially outer side of the disk, and the jitter was low over the entire area of the sample.

In contrast, the minimum recorded marks were formed in the sample of Table 3 such that they had substantially the same dimensional ratio irrespective of whether they were formed at a position operated at the linear velocity of less than 8 m/s or at a position operated at the linear velocity of 8 m/s or more, and the erasability was insufficient and the jitter was unduly high at the position where the linear velocity was 8 m/s or more.

MERITS OF THE INVENTION

In the present invention, control of increase in the jitter in the overwriting at a high linear velocity has been enabled with no increase in the crystallization speed of the recording layer by appropriately regulating the shape and dimensional ratio of the minimum recorded mark. In addition, if the present invention is applied to a medium which is operated at a constant angular velocity, increase in the jitter can be suppressed over the entire area of the medium.

Japanese Patent Application Nos. 309954/2000 and 272670/2001 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

The invention claimed is:

1. An optical recording method for recording a disk-shaped optical recording medium having a phase change recording layer comprising steps of:
   rotating the disk-shaped optical recording medium at a constant angular velocity; and
   forming amorphous recorded marks in the recording layer, wherein
   when a minimum signal has a length of $S_L$, a minimum amorphous recorded mark corresponding to said minimum signal has a maximum width of $M_W$, and a width $E_W$ that is 0.1 $M_W$,
   a position on a leading edge side of the amorphous recorded mark at the width of $E_W$ is an effective leading edge,
   a position on a trailing edge side of the amorphous recorded mark at the width of $E_W$ is an effective trailing edge,
   a distance between the effective leading edge and the effective trailing edge is an effective length $M_L$
   a distance between the effective leading edge and the position at which the width starts to decrease on the trailing edge side is $W_L$, and
   the minimum amorphous recorded marks are formed such that $W_L/M_L$ incrementally or gradually decreases from a radially inner side to a radially outer side of the optical recording medium.

2. The optical recording method according to claim 1 further comprising forming the minimum amorphous recorded marks in at least a part of the recording layer satisfying a relation:

$0.1 \leq W_L/M_L \leq 0.7$.

3. The optical recording method according to claim 1 wherein a relation:

$4 \text{ m/s} \leq V_{min}$ is satisfied when said optical recording medium is rotated at a minimum linear velocity of $V_{min}$.

4. The optical recording method according to claim 1 wherein a relation:

$30 \text{ Mbp} \leq R_{min}$ is satisfied when said optical recording medium has a minimum data transfer rate of $R_{min}$.

5. The optical recording method according to claim 1 wherein a relation:

$4.5 \text{ m/s} \leq V_{max} - V_{min}$ is satisfied when said optical recording medium is rotated at a minimum linear velocity of $V_{min}$ and a maximum linear velocity of $V_{max}$.

6. The optical recording method according to claim 1 wherein said minimum signal length $S_L$ is such that:

$S_L \leq 350$ nm.

7. The optical recording method according to claim 1 wherein a relation:

$30 \text{ Mbp} \leq R_{max} - R_{min}$ is satisfied when said optical recording medium has a minimum data transfer rate of $R_{min}$ and a maximum data transfer rate of $R_{max}$.

8. The optical recording method according to claim 1, wherein shape of the minimum amorphous recorded mark is such that width decreases from a position wherein the width is maximum toward both the leading edge and the trailing edge;
   the leading edge of the minimum amorphous recorded mark is arc shaped; and
   the trailing edge of the minimum amorphous recorded mark has a tail protruding rearward in a longitudinal direction of the recording track.

9. An optical recording medium including recorded amorphous marks formed by the optical recording method of claim 1.

10. An optical recording method for recording a disk-shaped optical recording medium having a phase change recording layer comprising steps of:
    rotating the disk-shaped optical recording medium at a constant angular velocity; and
    forming amorphous recorded marks in the recording layer, wherein
    when a minimum signal has a length of $S_L$, a minimum amorphous recorded mark corresponding to said minimum signal has a maximum width of $M_W$, and a width $E_W$ that is 0.1 $M_W$
    a position on a leading edge side of the amorphous recorded mark at the width of $E_W$ is designated an effective leading edge,
    a position on the trailing edge side of the recorded mark at the width of $E_W$ is an effective trailing edge,
    a distance between the effective leading edge and the effective trailing edge is an effective length $M_L$, and
    the minimum amorphous recorded marks are formed such that $S_L/M_L$ incrementally or gradually decreases from a radially inner side to a radially outer side of the optical recording medium.

11. The optical recording method according to claim 10 further comprising forming the minimum amorphous recorded marks in at least a part of the recording layer satisfying the relation:

$0.61 \leq S_L/M_L \leq 0.8$.

12. The optical recording method according to claim 10 wherein the relation:

$4 \text{ m/s} \leq V_{min}$ is satisfied when said optical recording medium is rotated at a minimum linear velocity of $V_{min}$.

13. The optical recording method according to claim 10 wherein the relation:

$30 \text{ Mbps} \leq R_{min}$ is satisfied when said optical recording medium has a minimum data transfer rate of $R_{min}$.

14. The optical recording method according to claim 10 wherein the relation:

$4.5 \text{ m/s} \leq V_{max} - V_{min}$ is satisfied when said optical recording medium is rotated at a minimum linear velocity of $V_{min}$ and a maximum linear velocity of $V_{max}$.

15. The optical recording method according to claim 10 wherein said minimum signal length $S_L$ is such that:

$S_L \leq 350$ nm.

16. The optical recording method according to claim 10 wherein the relation:

$$30 \text{ Mbps} \leq R_{max} - R_{min}$$

is satisfied when said optical recording medium has a minimum data transfer rate of $R_{min}$ and a maximum data transfer rate of $R_{max}$.

17. The optical recording method according to claim 10, wherein shape of the minimum amorphous recorded mark is such that its width decreases from the position wherein the width is its maximum toward both the leading edge and the trailing edge;
 the leading edge of the minimum amorphous recorded mark is arc shaped; and
 the trailing edge of the minimum amorphous recorded mark has a tail protruding rearward in the longitudinal direction of the recording track.

18. An optical recording medium including recorded amorphous marks formed by the optical recording method of claim 10.

19. An optical recording method for recording a disk-shaped optical recording medium having a phase change recording layer comprising steps of:
 rotating the disk-shaped optical recording medium at a constant angular velocity; and
 forming amorphous recorded marks in the recording layer, wherein
 when a minimum signal has a length of $S_L$ a minimum amorphous recorded mark corresponding to said minimum signal has a maximum width of $M_W$, and a width $E_W$ that is 0.1 $M_W$
 a position on a leading edge side of the amorphous recorded mark at the width of $E_W$ is an effective leading edge,
 a position on a trailing edge side of the amorphous recorded mark at the width of $E_W$ is an effective trailing edge,
 a distance between the effective leading edge and the effective trailing edge is an effective length $M_L$,
 the width of the amorphous recorded mark at a position wherein a distance from the effective leading edge is $S_L$ is $S_W$, and
 the minimum amorphous recorded marks are formed such that $S_W/M_W$ incrementally or gradually decreases from a radially inner side to a radially outer side of the optical recording medium.

20. The optical recording method according to claim 19 further comprising forming the minimum amorphous recorded marks in at least a part of the recording layer satisfying a relation:

$$0.1 \leq S_W/M_W \leq 0.8.$$

21. The optical recording method according to claim 19 wherein a relation:

$$4 \text{ m/s} \leq V_{min}$$

is satisfied when said optical recording medium is rotated at a minimum linear velocity of $V_{min}$.

22. The optical recording method according to claim 19 wherein a relation:

$$30 \text{Mbps} \leq R_{min}$$

is satisfied when said optical recording medium has a minimum data transfer rate of $R_{min}$.

23. The optical recording method according to claim 19 wherein a relation:

$$4.5 \text{ m/s} \leq V_{max} - V_{min}$$

is satisfied when said optical recording medium is rotated at a minimum linear velocity of $V_{min}$ and a maximum linear velocity of $V_{max}$.

24. The optical recording method according to claim 19 wherein said minimum signal length $S_L$ is such that:

ti $S_L \leq 350$ nm.

25. The optical recording method according to claim 19 wherein a relation:

$$30 \text{ Mbps} \leq R_{max} - R_{min}$$

is satisfied when said optical recording medium has a minimum data transfer rate of $R_{min}$ and a maximum data transfer rate of $R_{max}$.

26. The optical recording method according to claim 19, wherein shape of the minimum amorphous recorded mark is such that width decreases from a position wherein the width is its maximum toward both the leading edge and the trailing edge;
 the leading edge of the minimum amorphous recorded mark is arc shaped; and
 the trailing edge of the minimum amorphous recorded mark has a tail protruding rearward in a longitudinal direction of the recording track.

27. An optical recording medium including recorded amorphous marks formed by the optical recording method of claim 19.

28. An optical recording method for recording a disk-shaped optical recording medium having a phase change recording layer comprising:
 forming amorphous recorded marks in the recording layer, wherein
 when a minimum signal has a length of $S_L$, a minimum amorphous recorded mark corresponding to said minimum signal has a maximum width of $M_W$, and a width $E_W$ that is 0.1 $M_W$,
 a position on a leading edge side of the amorphous recorded mark at the width of $E_W$ is an effective leading edge,
 a position on a trailing edge side of the amorphous recorded mark at the width of $E_W$ is an effective trailing edge,
 a distance between the effective leading edge and the effective trailing edge is an effective length $M_L$, and
 minimum amorphous recorded marks satisfying the relation:

$$0.1 \leq W_L/M_L \leq 0.7$$

are formed over the entire area of the recording layer.

29. The optical recording method according to claim 28 wherein said optical recording medium is operated at a linear velocity of at least 8 m/s.

30. The optical recording method according to claim 28, wherein shape of the minimum amorphous recorded mark is such that width decreases from a position wherein the width is maximum toward both the leading edge and the trailing edge;
 the leading edge of the minimum amorphous recorded mark is arc shaped; and
 the trailing edge of the minimum amorphous recorded mark has a tail protruding rearward in a longitudinal direction of the recording track.

31. An optical recording medium including recorded amorphous marks formed by the optical recording method of claim 28.

32. An optical recording method for recording a disk-shaped optical recording medium having a phase change recording layer comprising:

forming amorphous recorded marks in the recording layer, wherein when a minimum signal has a length of $S_L$, a minimum amorphous recorded mark corresponding to said minimum signal has a maximum width of $M_W$, and a width $E_W$ that is 0.1 $M_W$, a position on a leading edge side of the amorphous recorded mark at the width of $E_W$ is an effective leading edge, a position on a trailing edge side of the amorphous recorded mark at the width of $E_W$ is an effective trailing edge, a distance between the effective leading edge and the effective trailing edge is an effective length $M_L$, and minimum recorded marks satisfying the relation:

$$0.61 \leq S_L/M_L \leq 0.8$$

are formed over the entire area of the recording layer.

33. The optical recording method according to claim 32 wherein said optical recording medium is operated at a linear velocity of at least 8 m/s.

34. The optical recording method according to claim 32, wherein shape of the minimum amorphous recorded mark is such that its width decreases from the position wherein the width is its maximum toward both the leading edge and the trailing edge;

the leading edge of the minimum amorphous recorded mark is arc shaped; and the trailing edge of the minimum amorphous recorded mark has a tail protruding rearward in the longitudinal direction of the recording track.

35. An optical recording medium including recorded amorphous marks formed by the optical recording method of claim 32.

36. An optical recording method for recording a disk-shaped optical recording medium having a phase change recording layer comprising steps of:

rotating the disk-shaped optical recording medium at a constant angular velocity; and forming amorphous recorded marks in the recording layer, wherein when a minimum signal has a length of $S_L$ a minimum amorphous recorded mark corresponding to said minimum signal has a maximum width of $M_W$, and a width $E_W$ that is 0.1 $M_W$ a position on a leading edge side of the amorphous recorded mark at the width of $E_W$ is an effective leading edge;

a position on a trailing edge side of the amorphous recorded mark at the width of $E_W$ is an effective trailing edge, a distance between the effective leading edge and the effective trailing edge is an effective length $M_L$, the width of the amorphous recorded mark at a position wherein a distance from the effective leading edge is $S_L$ is $S_W$, and minimum amorphous recorded marks satisfying the relation:

$$0.1 \leq S_W/M_W \leq 0.8$$

are formed over the entire area of the recording layer.

37. The optical recording method according to claim 36 wherein said optical recording medium is operated at a linear velocity of at least 8 m/s.

38. The optical recording method according to claim 36, wherein shape of the minimum amorphous recorded mark is such that its width decreases from the position wherein the width is its maximum toward both the leading edge and the trailing edge;

the leading edge of the minimum amorphous recorded mark is arc shaped; and the trailing edge of the minimum amorphous recorded mark has a tail protruding rearward in the longitudinal direction of the recording track.

39. An optical recording medium including recorded amorphous marks formed by the optical recording method of claim 36.

* * * * *